United States Patent
Pastore

(10) Patent No.: US 12,021,439 B2
(45) Date of Patent: Jun. 25, 2024

(54) SWITCHING DELAY FOR COMMUNICATION

(71) Applicant: POWER INTEGRATIONS, Inc., San Jose, CA (US)

(72) Inventor: Tiziano Pastore, Los Gatos, CA (US)

(73) Assignee: POWER INTEGRATIONS, INC., San Jose, CA (US)

(*) Notice: Subject to any disclaimer, the term of this patent is extended or adjusted under 35 U.S.C. 154(b) by 248 days.

(21) Appl. No.: 17/605,452

(22) PCT Filed: May 24, 2019

(86) PCT No.: PCT/US2019/033946
§ 371 (c)(1),
(2) Date: Oct. 21, 2021

(87) PCT Pub. No.: WO2020/242440
PCT Pub. Date: Dec. 3, 2020

(65) Prior Publication Data
US 2022/0190703 A1    Jun. 16, 2022

(51) Int. Cl.
*H02M 1/00* (2007.01)
*H02M 1/08* (2006.01)
*H02M 3/335* (2006.01)

(52) U.S. Cl.
CPC ........... *H02M 1/0003* (2021.05); *H02M 1/08* (2013.01); *H02M 3/33523* (2013.01)

(58) Field of Classification Search
CPC ........... H02M 3/22; H02M 1/08; H02M 1/36; H02M 3/24; H02M 3/325; H02M 3/335;
(Continued)

(56) References Cited

U.S. PATENT DOCUMENTS

| 6,337,788 B1 | 1/2002 | Balakrishnan et al. |
| 6,580,593 B2 | 6/2003 | Balakrishnan |

(Continued)

FOREIGN PATENT DOCUMENTS

| CN | 105826899 B | 9/2018 |
| WO | 2021034745 A1 | 2/2021 |

OTHER PUBLICATIONS

International Application No. PCT/US2019/033946, "International Search Report and Written Opinion of the International Searching Authority," Mar. 9, 2020, 11 pages.

*Primary Examiner* — Jeffrey A Gblende
(74) *Attorney, Agent, or Firm* — Karina Martha G. Li; POWER INTEGRATIONS, INC.

(57) ABSTRACT

A controller for use in a power converter including a first controller coupled to control switching of a power switch of the power converter to transfer energy to an output of the power converter. The first controller includes a communication delay generator configured to receive a first signal. The communication delay generator determines a communication delay in response to the first signal and outputs a communication signal representative of the communication delay. The first controller further includes a drive circuit coupled to the communication delay generator and configured to receive a request signal which includes a request event to turn ON the power switch. The drive circuit turns ON the power switch in response to the request event. The drive circuit is further configured to receive the communication signal and responsive to the communication signal, delays the turn ON of the power switch by the communication delay.

29 Claims, 8 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; Y02B 70/1491

See application file for complete search history.

(56) References Cited

U.S. PATENT DOCUMENTS

| | | | |
|---|---|---|---|
| 6,583,663 B1 | 6/2003 | Disney | |
| 6,754,089 B2 | 6/2004 | Balakrishnan et al. | |
| 7,157,813 B2 | 1/2007 | Djenguerian et al. | |
| 7,443,153 B2 | 10/2008 | Mayell | |
| 7,593,245 B2 | 9/2009 | Djenguerian et al. | |
| 7,613,019 B2 | 11/2009 | Kroes | |
| 7,728,680 B2 | 6/2010 | Thalheim et al. | |
| 7,764,520 B2 | 7/2010 | Djenguerian et al. | |
| 7,893,754 B1 | 2/2011 | Kung et al. | |
| 7,952,895 B2 | 5/2011 | Matthews et al. | |
| 7,995,359 B2 | 8/2011 | Djenguerian et al. | |
| 8,035,939 B2 | 10/2011 | Orr et al. | |
| 8,077,484 B2 | 12/2011 | Djenguerian et al. | |
| 8,098,506 B2 | 1/2012 | Saint-Pierre | |
| 8,188,618 B2 * | 5/2012 | Hori | H02J 1/08 307/80 |
| 8,225,111 B2 | 7/2012 | Bailey et al. | |
| 8,665,621 B2 * | 3/2014 | Tsai | H02H 9/023 363/71 |
| 8,818,296 B2 | 8/2014 | Kung et al. | |
| 8,976,561 B2 | 3/2015 | Balakrishnan et al. | |
| 9,035,435 B2 | 5/2015 | Balakrishnan et al. | |
| 9,071,152 B2 | 6/2015 | Morong et al. | |
| 9,276,479 B2 | 3/2016 | Djenguerian et al. | |
| 9,374,011 B2 | 6/2016 | Liu et al. | |
| 9,391,523 B2 | 7/2016 | Gaknoki et al. | |
| 9,444,278 B2 | 9/2016 | Baurle | |
| 9,502,985 B2 | 11/2016 | Werner et al. | |
| 9,584,027 B2 | 2/2017 | Polivka | |
| 9,948,294 B2 | 4/2018 | Peter et al. | |
| 10,008,942 B1 | 6/2018 | Horwitz et al. | |
| 10,033,284 B2 | 7/2018 | Werner et al. | |
| 10,122,287 B2 | 11/2018 | Leong et al. | |
| 10,181,813 B2 | 1/2019 | Baurle et al. | |
| 10,243,555 B2 | 3/2019 | Siebler | |
| 10,418,908 B1 | 9/2019 | Pastore et al. | |
| 10,468,974 B2 * | 11/2019 | Lee | H03K 17/04206 |
| 10,491,126 B1 | 11/2019 | Pastore et al. | |
| 10,554,134 B2 | 2/2020 | Werner et al. | |
| 10,554,136 B1 | 2/2020 | Miletic | |
| 10,574,302 B2 | 2/2020 | Garcia et al. | |
| 10,644,688 B2 | 5/2020 | Wang | |
| 10,686,362 B2 * | 6/2020 | Dusmez | H02M 7/217 |
| 10,797,583 B2 | 10/2020 | Mayell et al. | |
| 10,811,956 B2 | 10/2020 | Moore et al. | |
| 10,819,102 B2 | 10/2020 | Mayell | |
| 10,826,375 B2 | 11/2020 | Wang et al. | |
| 10,826,398 B2 | 11/2020 | Wang et al. | |
| 10,886,870 B2 | 1/2021 | Baurle et al. | |
| 2006/0095221 A1 * | 5/2006 | Salmi | G01R 31/31922 702/106 |
| 2007/0182253 A1 | 8/2007 | Wu et al. | |
| 2008/0266016 A1 | 10/2008 | Uhl et al. | |
| 2009/0309644 A1 * | 12/2009 | Behrends | H03K 5/133 327/278 |
| 2018/0358902 A1 | 12/2018 | Duvnjak | |
| 2021/0167680 A1 | 6/2021 | Odell et al. | |
| 2021/0184556 A1 | 6/2021 | Deng et al. | |
| 2021/0194378 A1 | 6/2021 | Tian et al. | |

* cited by examiner

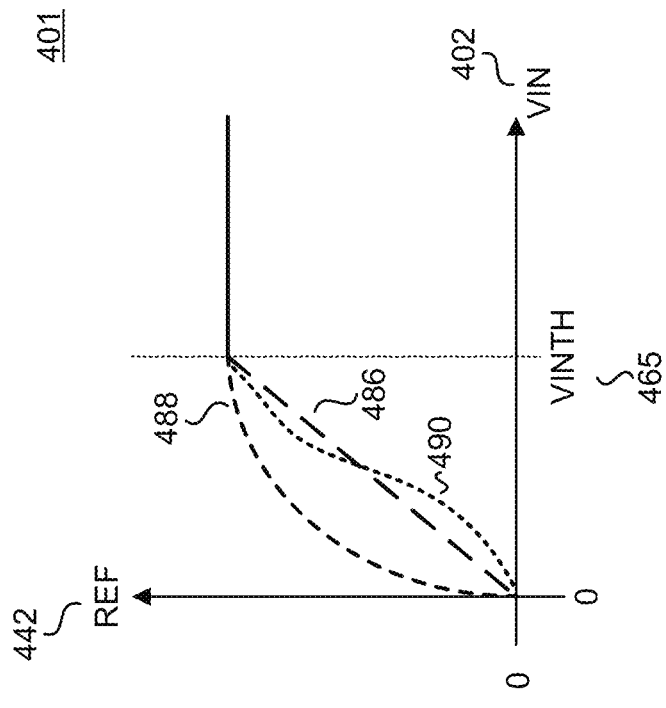
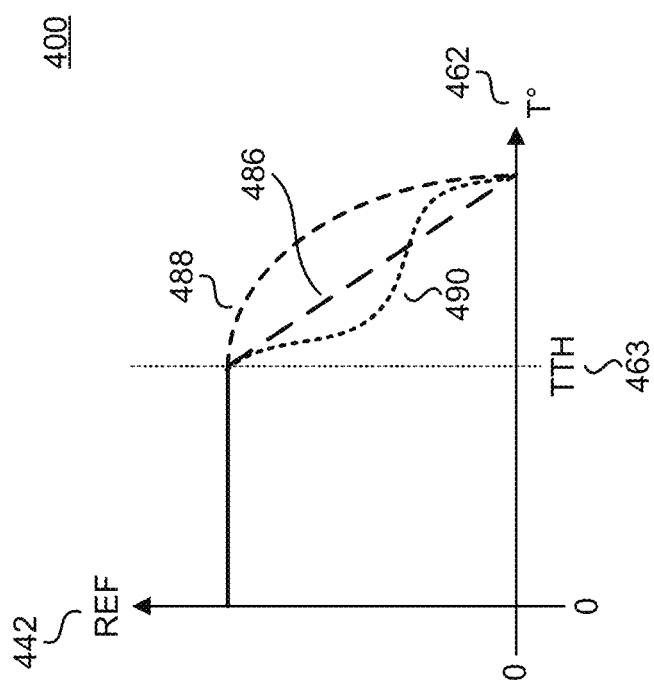
FIG. 4A
FIG. 4B

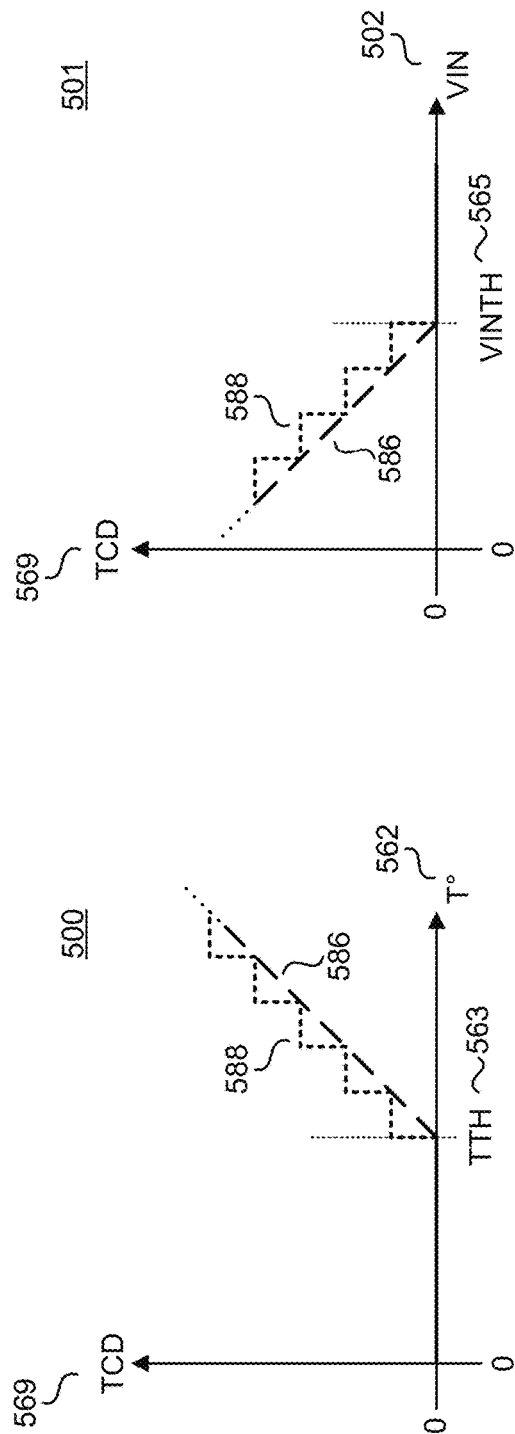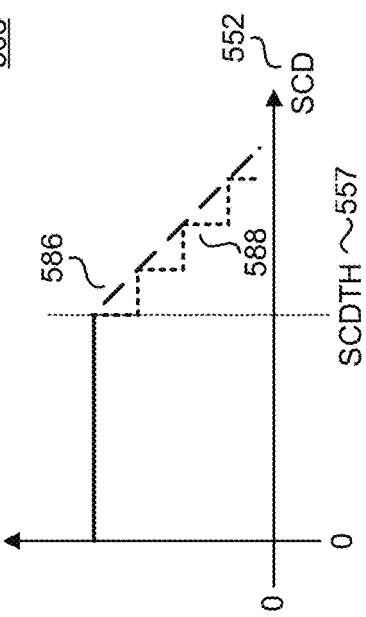

SWITCHING DELAY FOR COMMUNICATION

BACKGROUND OF THE INVENTION

This application is the U.S. National Stage entry under 35 U.S.C. § 371 of International Application No. PCT/US2019/033946, filed May 24, 2019, which is incorporated in its entirety herein by reference.

1. Field of the Invention

The present invention relates generally to power converters, and more specifically to switched mode power converters.

2. Discussion of the Related Art

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. In operation, a switch is utilized to provide the desired output by varying the duty cycle (typically the ratio of the on-time of the switch to the total switching period), varying the switching frequency, or varying the number of pulses per unit time of the switch in a switched mode power converter.

Properties, such as efficiency, size, weight, and cost are usually taken into account when designing a power converter and controller. Switched mode power converters and controllers may also be designed to meet standards set by regulatory agencies. Safety requirements for switched mode power converters generally require galvanic isolation between the input and the output of the power converter. High frequency transformers are generally used to provide galvanic isolation between the input and output of the switch mode power converter in addition to transferring the energy from the input to the output.

The switched mode power converter also includes a controller. Output regulation may be achieved by sensing and controlling the output in a closed loop. The controller may receive a signal representative of the output, and the controller varies one or more parameters in response to the signal to regulate the output to a desired quantity. Various modes of control may be utilized such as pulse width modulation (PWM) control, pulse frequency modulation (PFM) control, or ON/OFF control.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4A illustrates a relationship between a temperature and an output reference in accordance with embodiments of the present disclosure.

FIG. 4B illustrates a relationship between an input voltage and an output reference in accordance with embodiments of the present disclosure.

FIG. 5A illustrates a relationship between temperature and a communication delay in accordance with embodiments of the present disclosure.

FIG. 5B illustrates a relationship between input voltage and the communication delay in accordance with embodiments of the present disclosure.

FIG. 5C illustrates a relationship between the sensed communication delay and the output reference in accordance with embodiments of the present disclosure.

Figure 1:
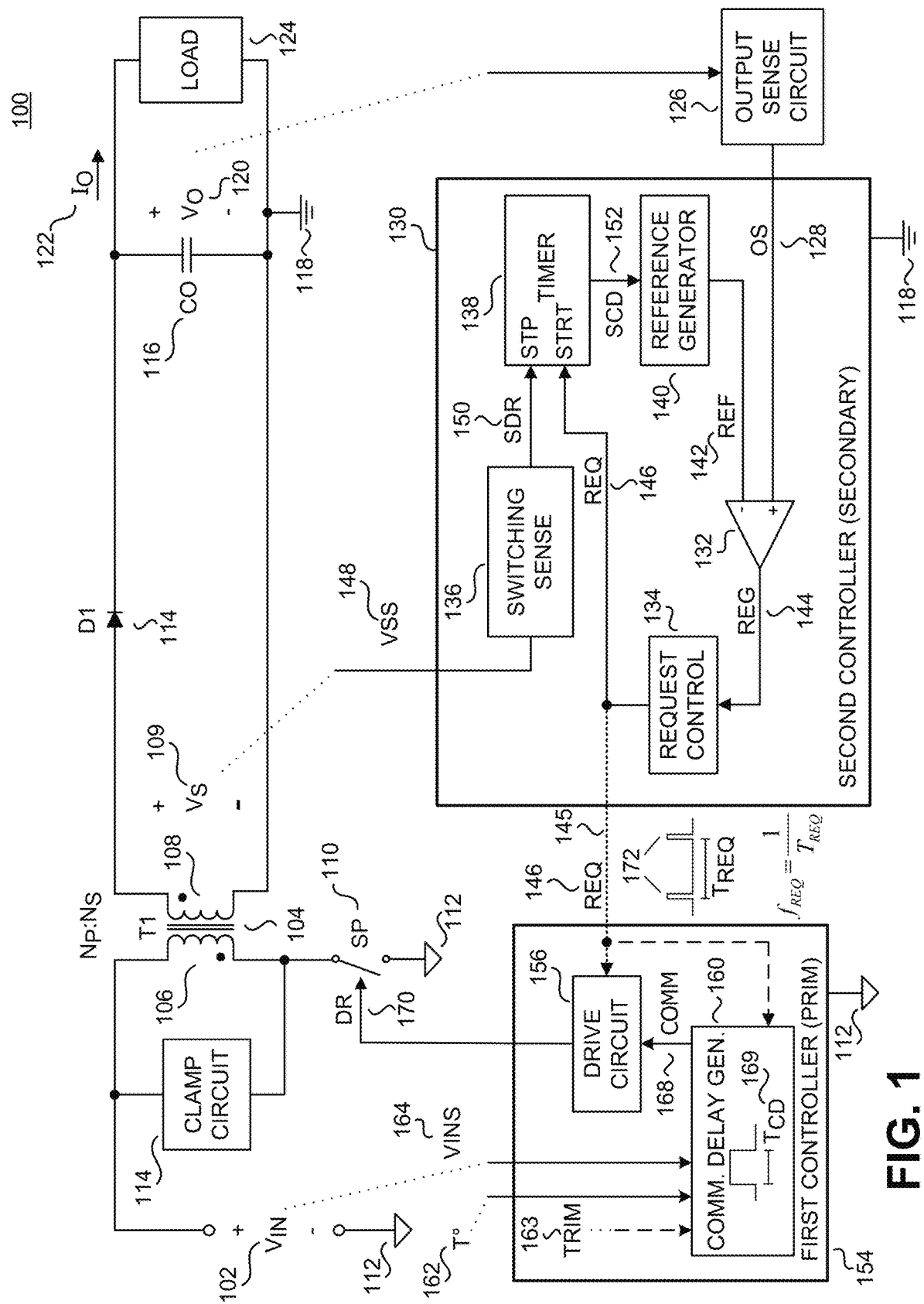
FIG. 1 is a schematic illustrating an example power converter, second controller, and first controller with a communication delay generator in accordance with embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The controller which controls the transfer of energy for a power converter may include a first controller and a second controller. In one example, the first controller is referenced to the input return and controls the switching of the primary-side power switch of the power converter. When the first controller is coupled to the primary-side of the power converter, the first controller may also be referred to as a primary controller. In a further example, the second controller is referenced to the output return of the power converter and receives an output sense signal representative of the output of the power converter. Similarly, when the second controller is coupled to the secondary-side of the power converter, the second controller may also be referred to as a secondary controller. In response to the output sense signal, the second controller determines when the power converter should transfer energy from its input to its output. The second controller sends a request signal to the first controller to initiate switching of the power switch. In response to the request signal, the first controller turns ON the primary-side power switch. The second controller could also control one or more switches. In one example, the second controller may control one or more switches on the secondary-side of the power converter, such as a synchronous rectifier, selection switch, or pass field-effect-transistor (FET). In another example, the second controller may control another primary-side power switch, such as a high-side switch in a half-bridge power converter. The second controller can communicate to the first controller via a communication link. In general, the communication link provides galvanic isolation using an inductive coupling, such as a transformer or coupled inductor, an optocoupler, capacitive coupling, or other device that maintains galvanic isolation. The communication link is generally unidirectional from the second controller to the first controller.

However, it could be useful for the second controller to receive information from the first controller regarding primary-side sensed parameters, such as temperature, input voltage, or the timing of the peaks or valleys of the input voltage. In accordance with embodiments of the present disclosure, the first controller communicates with the second controller by inserting a delay prior to turning ON the power switch in response to the request signal received from the second controller. The inserted delay may be referred to as a communication delay. As will be further discussed, the duration of the delay could be varied to communicate information, such as primary-side sensed parameters, to the second controller. In one example, the second controller senses the communication delay via the secondary output winding of the energy transfer element of the power converter. From the secondary output winding, the second controller can sense one or more switching parameters of the primary-side power switch. These switching parameters could include the time of turn on, the time of turn off, the length of the turn on time (i.e. on-time), and/or the length of the turn off time (i.e. off-time) of the power switch.

As mentioned above, the second controller sends the request signal to the first controller to turn ON the power switch. In one embodiment, the second controller may utilize the request signal and the one or more sensed primary-side switching parameters from the secondary winding to sense the communication delay from the first controller. As such, the first controller can communicate to the second controller.

The second controller could vary the value of the target output reference in response to the sensed communication delay. By varying the target output reference, the primary and second controller may vary the power delivery of the power converter in response to one or more primary-side sensed parameters. For example, temperatures of one or more components on the primary-side of the power converter could rise to unsafe values. The first controller could insert a communication delay representative of the temperature of one or more components on the primary-side of the power converter. The second controller senses the communication delay. If the sensed communication delay is greater than a threshold, the second controller may vary the target output reference to reduce power delivery of the power converter, which may then lower the temperature and/or protect components from overheating.

In another example a reduction of the input voltage $V_{IN}$ provided to the power converter may result in the power converter overworking to compensate for the lower input voltage $V_{IN}$, which may damage components. The first controller may communicate the value of the input voltage $V_{IN}$ to the second controller via the communication delay. The second controller senses the communication delay and may reduce output delivery in response to the communicated input voltage $V_{IN}$, which may protect the components of the power converter.

To illustrate, FIG. 1 is a schematic illustrating an example switched mode power converter 100, second controller 130, and first controller 154 with a communication delay generator 160 in accordance with an embodiment of the disclosure. The second controller 130 also includes a switching sense 136 and a timer 138 to sense the communication delay TCD of the communication delay generator 160 in accordance with an embodiment of the disclosure.

In one example, the power converter 100 provides output power to the load 124 from an unregulated input voltage $V_{IN}$ 102, which in one example may be a rectified ac line voltage, a rectified and filtered ac line voltage, or a dc voltage. In the depicted example, the input voltage $V_{IN}$ 102 is a full wave rectified voltage having a line cycle, which includes two half cycles of an ac input voltage waveform. The input voltage $V_{IN}$ 102 is coupled to an energy transfer element T1 104. In some embodiments, the energy transfer element T1 104 may be a coupled inductor, transformer, or an inductor. The example energy transfer element 104 shown in FIG. 1 includes two windings, a primary winding 106 with $N_P$ number of turns and a secondary winding 108 with $N_S$ number of turns. The voltage across the secondary winding 108 is shown as VS 109 and is related to the voltage across the primary winding 106 by the turns ratio of the energy transfer element T1 104. Although the example shown in FIG. 1 illustrates an energy transfer element T1 104 with two windings, it should be appreciated that the energy transfer element 104 may have more than or less than two windings. Coupled across the primary winding 106 is the clamp circuit 114, which limits the maximum voltage across a power switch SP 110 that is coupled to the primary winding 106 and an input return 112 as shown.

The secondary winding 108 is coupled to the output rectifier D1 114, which in the depicted example is shown as a diode. However, in another example, it should be appreciated that the output rectifier D1 114 may be substituted with a transistor used as a synchronous rectifier. The example power converter 100 also illustrates a high side coupled output rectifier D1 114, but it should be appreciated the output rectifier D1 114 may also be low side coupled. An output capacitor CO 116 is shown as being coupled to the output rectifier D1 114 and output return 118. As will be further discussed, the power converter 100 includes a first controller 154 and second controller 130 which regulate the output of power converter 100. In general, the output of the power converter 100 is an output voltage $V_O$ 120, an output current $I_O$ 122, or a combination of the two. An output sense circuit 126 is coupled to sense the output of the power converter 100 to provide the output sense signal OS 128, also sometimes referred to as a feedback signal. The output sense signal OS 128 may be representative of the output voltage $V_O$ 120, an output current $I_O$ 122, a combination of the two, or of the energy delivered by the energy transfer element T1 104.

In the illustrated example, the power converter 100 is shown as having a flyback topology. It should be appreciated that other known topologies and configurations of power converters may also benefit from the teachings of the present disclosure. In the depicted example, the input of power converter 100 is galvanically isolated from the output of power converter 100, such that input return 112 is galvanically isolated from output return 118. Since the input and output of power converter 100 are galvanically isolated, there is no direct current (dc) path across the isolation barrier of energy transfer element T1 104, or between primary winding 106 and secondary winding 108, or between input return 112 and output return 118. Further, the first controller 154 is shown as referenced to the input return 112 while the second controller 130 is referenced to output return 118. As such, the first controller 154 is galvanically isolated from the second controller 130. However, it should be appreciated that non-isolated converter topologies may benefit from the teachings of the present disclosure. Further, embodiments of the present disclosure could be used with two controllers which are not isolated from each other. For example, a half bridge power converter generally has a high side controller separated from the low side controller. Teachings of the present disclosure could be utilized by the high side controller and the low side controller.

As shown in the depicted example, the power converter 100 further includes the second controller 130 coupled to receive the output sense signal OS 128. The second controller 130 generates the request signal REQ 146 in response to the output sense signal OS 128. The request signal REQ 146 may include request events 172 which indicate that the first controller 154 should turn ON the power switch SP 110. The request signal REQ 146 may be a rectangular pulse waveform which pulses to a logic high value and quickly returns to a logic low value. The logic high pulses may be referred to as request events 172. The frequency of the request events 172 is generally referred to as the request frequency $f_{REQ}$, with its inverse referred to as the request period $T_{REQ}$.

The first controller 154 is coupled to receive the request signal REQ 146 and generate the drive signal DR 170 in response to the request signal REQ 146. The drive signal DR 170 controls the turn ON and turn OFF of the power switch SP 110. In one example, the drive signal DR 170 is a rectangular pulse waveform with varying durations of logic high and logic low sections. In one example, a logic high value in the drive signal DR 170 turns ON the power switch SP 110 while a logic low value turns OFF the power switch SP 110, or vice versa. The duration of the logic high section may be referred to as the on-time of the power switch SP 110 while the duration of the logic low section may be referred to as the off-time of the power switch SP 110, or vice versa. Further, the sum of the on-time and the off-time may be referred to as the switching period, which is the inverse of the switching frequency. In general, the switching period/switching frequency may be derived from the request period $T_{REQ}$/request frequency $f_{REQ}$.

To regulate the output provided to the load 124, the first controller 154 and second controller 130 vary one or more switching parameters of the power switch SP 110. Example parameters may include the on-time, off-time, and the switching frequency/switching period. The various values which the first controller 154 and second controller 130 may choose for the more switching parameters may be referred to as the operational states. In one example, the second controller 130 may control the switching frequency of power switch SP 110 via the request signal REQ 146 while the first controller 154 may control the on-time of the power switch SP 110. In one example, the on-time may be determined by when the current through the power switch SP 110 reaches a current limit. In another example, the on-time may be determined by the frequency of the request events 172 ($f_{REQ}$) of the request signal REQ 146. In another example, the second controller 130 may increase the switching frequency of power switch SP 110 to deliver more energy to the load 124. However, it should be appreciated that other control schemes may be utilized.

The second controller 130 is shown as including comparator 132, request control 134, switching sense circuit 136, timer 138, and reference generator 140. Comparator 132 is coupled to receive the output sense signal OS 128 and the reference REF 142 and outputs the regulation signal REG 144. As shown, the output sense signal OS 128 is received at the non-inverting input while the reference REF 142 is received at the inverting input of comparator 132. In one example, the reference REF 142 is representative of a target output value for the output of the power converter 100, such as the output voltage $V_O$ 120, output current $I_O$ 122, or a combination of the two. In the example shown, reference REF 142 is variable and as will be further discussed, variable with respect to the sensed communication delay.

Request control 134 is coupled to receive the regulation signal REG 144 from the output of comparator 132 and outputs the request signal REQ 146. The request signal REQ 146 includes request events 172 that are generated in response to the comparison of the output sense signal OS 128 to the value of reference REF 142 and indicates that the first controller 154 should turn ON the power switch SP 110. The time between leading edges (or trailing edges) of the request events 172 is referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 172 may be responsive to the output sense signal OS 128 (via the comparison of the output sense signal OS 128 to the reference REF 142). In one example, the request frequency $f_{REQ}$ increases if the output sense signal OS 128 is less than reference REF 142 and decreases if the output sense signal OS 128 is greater than reference REF 142. In another example, the request control 134 outputs a request event when the output sense signal OS 128 is less than the reference REF 142. As will be further discussed, the reference REF 142 may be varied in response to a sensed communication delay.

First controller 154 is coupled to receive the request signal REQ 146 through a communication link 145. In the example illustrated, communication link 145 is shown in dashed lines to indicate that the communication link 145 provides galvanic isolation between the first controller 154 and the second controller 130. The galvanic isolation may be provided by using an inductive coupling, such as a transformer or coupled inductor, an optocoupler, a capacitive coupling, or other device that maintains galvanic isolation. For the example shown, communication link 145 is unidirectional from the second controller 130 to the first controller 154.

First controller 154 includes drive circuit 156 and the communication delay generator 160. The drive circuit 156 is coupled to receive the request signal REQ 146 and generates the drive signal DR 170 in response to the request events 172 in the request signal REQ 146. Drive circuit 156 is further coupled to control switching of the power switch SP 110 to control the transfer of energy from the input to the output of the power converter 100. For example, the drive circuit 156 may transition the drive signal DR 170 to turn ON the power switch SP 110 in response to a received request event 172.

It is generally understood that a switch that is closed may conduct current and is considered on, while a switch that is open cannot conduct current and is considered off. In one example, the power switch SP 110 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT). The frequency of the request events 172 (i.e., $f_{REQ}$) generally sets the switching frequency of the power switch SP 110 under most circumstances.

In one example, first controller 154 and second controller 130 may be formed as part of an integrated circuit that is manufactured as either a hybrid or monolithic integrated circuit, or may be implemented with discrete electrical components or a combination of discrete and integrated components. In one example, the power switch SP 110 may also be integrated in a single integrated circuit package with the first controller 154 and the second controller 130. In addition, in one example, first controller 154 and second controller 130 may be formed as separate integrated circuits. The power switch SP 110 may also be integrated in the same integrated circuit as the first controller 154 or could be formed on its own integrated circuit. Further, it should be appreciated that both the first controller 154, the second controller 130, and power switch SP 110 need not be included in a single package and may be implemented in separate controller packages or a combination of combined/separate packages. The communication link 145 may be formed from a lead frame which supports the integrated circuit(s) of the first 154 and second 130 controllers.

In some instances, the first controller 154 may want to communicate to the second controller 130. However, the communication link 145 is unidirectional from the second controller 130 to the first controller 154. In one example of the present disclosure, the first controller 154 can communicate to the second controller 130 by delaying the turn ON of the power switch SP 110 after receiving a request event 172 in the request signal REQ 146. In other words, the first controller 154 can insert a delay which communicates information to the second controller 130. As will be further discussed, the second controller 130 can sense and measure the delay by monitoring the secondary winding 108 of the energy transfer element T1 104.

As shown, the first controller 154 includes a communication delay generator 160. The communication delay generator 160 determines the length of delay to be inserted prior to turning ON the power switch SP 110 to communicate information to the second controller 130. This inserted delay can be referred to as a communication delay TCD 169. The first controller 154 and the communication delay generator 160 are shown as receiving a temperature signal 162, representative of the temperature of one or more components on the primary-side of the power converter 100, and the sensed input voltage signal VINS 164, representative of the input voltage VIN 102. It should be appreciated that the communication delay generator 160 can receive either the temperature signal 162 or the sensed input voltage signal VINS 164 or both signals. In response either the temperature signal 162 or the sensed input voltage signal VINS 164, the communication delay generator 160 determines the duration of the communication delay TCD 169 and outputs the communication signal COMM 168 to the drive circuit 156. The communication signal COMM 168 is representative of the duration of the communication delay TCD 169 and may be an analog or a digital signal. The drive circuit 156 delays the turn ON of the power switch SP 110 in response to a request event 172 by the duration of the communication delay TCD 169 indicated by the communication signal COMM 168. In one example, the drive circuit 156 delays the turn ON of the power switch SP 110 by the duration of the communication delay TCD 169 indicated by the communication signal COMM 168 for every switching cycle of the power switch SP 110. For one example, the minimum switching period $T_{SW}$ of the power switch SP 110 may be 10 microseconds (µs) with a maximum on-time TON of 6.5 µs. For this example, the length of the communication delay TCD 169 may be between 0-3 µs. In another example, the longest communication delay signal TCD 169 should be less than or equal to the maximum off-time $T_{OFF}$ of the power switch SP 110. However, practical limitations may limit the longest duration of the communication delay signal TCD 169.

In one example (and as shown with respect to FIG. 5A), the communication delay TCD 169 is substantially zero if the temperature signal 162 indicates that the temperature is below a temperature threshold TTH. If the temperature is greater than the temperature threshold TTH, the communication delay TCD 169 generally increases with increasing temperature. Similarly (and as shown with respect to FIG. 5B), the communication delay TCD 169 is substantially zero for input voltages $V_{IN}$ 102 above an input voltage threshold VINTH. For input voltages $V_{IN}$ 102 less than the input voltage threshold VINTH, the communication delay TCD 169 generally increases with decreasing input voltage $V_{IN}$ 102.

Temperature of one or more components on the primary-side (such as the power switch SP 110), the input voltage $V_{IN}$ 102, or the timing of the minimum and maximum values of the input voltage $V_{IN}$ 102 are example of primary-side sensed information which could be communicated, via a communication delay TCD 169 inserted prior to turning ON the power switch SP 110, to the second controller 130. For example, if the temperature rises to an unsafe value, the first controller 154 may want to communicate the sensed temperature to the second controller 130. In response to the communicated temperature, the second controller 130 may reduce power delivery, which may then lower the temperature and/or protect components from overheating. For example, power delivery could be reduced for temperatures greater than 100° C., 110° C., or 120° C. In another example, if the input voltage $V_{IN}$ 102 falls, the power converter 100 may begin to overwork to compensate for the lower input voltage $V_{IN}$ 102, which may damage components. These same components may need to be overdesigned to handle the additional stress related to those extra-ordinary conditions, causing additional cost and/or volume. The first controller 154 may communicate the value of the input voltage $V_{IN}$ 102 to the second controller 130, the second controller may reduce power delivery in response to the sensed input voltage $V_{IN}$ 102, which may protect the components of the power converter 100. For example, power delivery may be reduced when the input voltage $V_{IN}$ 102 falls below 80 volts.

In a further example, the first controller 154 may communicate the timing of the minimum and maximum values of the input voltage $V_{IN}$ 102 to the second controller 130 by inserting a communication delay TCD 169 when the input voltage $V_{IN}$ 102 is at either its minimum or maximum value. In one example, the communication delay generator 160 outputs the communication signal COMM 168 with a first fixed communication delay TCD 169 when the input voltage $V_{IN}$ 102 is at its minimum value. The drive circuit 156 delays the turn ON of power switch SP 110 by the first fixed communication delay TCD 169 as indicated by the communication signal COMM 168. The communication delay generator 160 could output the communication signal COMM 168 with a second fixed communication delay TCD 169 when the input voltage $V_{IN}$ 102 is at its maximum value. The drive circuit 156 delays the turn ON of power switch SP 110 by the second fixed communication delay TCD 169 as indicated by the communication signal COMM 168. The value for the first fixed communication delay is different from the value of the second fixed communication delay. Although the example shown in FIG. 1 illustrates primary to secondary communications related to temperature or the input voltage $V_{IN}$ 102, it should be appreciated that other information could also be communicated by inserting a communication delay TCD 169 prior to turning ON the power switch SP 110.

For example, the first controller 154 can optionally communicate its trim settings to the second controller 130. In particular, the first controller 154 can communicate its trim settings to the second controller 130 while both the first controller 154 and the second controller 130 are operating in a test mode. In one example, the communication delay generator 160 receives the request signal REQ 146 and a trim signal TRIM 163. The request signal REQ 146 may be representative of a request to turn ON the power switch SP 110. In addition, the request signal REQ 146 may be representative of a request for first controller information by the second controller 130. The trim signal TRIM 163 may be representative of one or more trim options of the first controller 154. For example, the trim signal TRIM 163 may be representative of voltage or current references of the first controller 154, such as the value of the current limit for power switch SP 110. The trim signal TRIM 163 may also be representative of whether various protection features are enabled or disabled, such as whether line undervoltage-lockout (UVLO) is enabled or disabled. Further, the trim signal TRIM 163 may be representative of the thermal foldback setting of the first controller 154, such as whether the first controller 154 is implementing thermal foldback based on internal junction temperature or on external NTC resistor value. It should be appreciated that the request signal REQ 146 received by the communication delay generator 160 and the trim signal TRIM 163 are shown in dashed lines to indicate that these are optional and/or used in a test mode of the first controller 154.

The communication delay generator 160 determines the length of the communication delay TCD 169 delay to be inserted prior to turning ON the power switch SP 110 to communicate trim information to the second controller 130. This inserted delay can be referred to as a communication delay TCD 169. In response to the request signal REQ 146 and the trim signal TRIM 163, the communication delay generator 160 determines the duration of the communication delay TCD 169 and outputs the communication signal COMM 168 to the drive circuit 156. In one example, request signal REQ 146 may include one or more pulses in a sequence to request specific trim information from the first controller 154. For example, for a first sequence of pulses, the communication delay generator 160 may determine the communication delay TCD 169 representative of a first trim option, such as the value of the power switch current limit. For a second sequence of pulses, the communication delay generator 160 may determine the communication delay TCD 169 representative of a second trim option, such as whether UVLO has been enabled or disabled, and so on.

Second controller 130 further includes a switching sense 136, timer 138 and reference generator 140. The second controller 130 is coupled to receive the secondary voltage sense VSS 148, which is representative of the secondary winding 108. Further, the secondary voltage sense VSS 148 is representative of the secondary winding voltage $V_S$ 109. In one example, secondary voltage sense VSS 148 may be provided directly from the secondary winding 108. For example, if the secondary voltage sense VSS 148 is provided directly from the dot end of the secondary winding 108, secondary voltage sense VSS 148 would be substantially equal to the secondary voltage VS 109 and would be in-phase with the voltage across the power switch SP 110. If the secondary voltage sense VSS 148 is provided directly from the other end of the secondary winding 108 without the dot, the secondary voltage sense VSS 148 would be out-of-phase the secondary voltage $V_S$ 109 and the voltage across the power switch SP 110. A resistor divider or other scaling circuit could be used to provide the secondary voltage sense VSS 148. As such, the secondary voltage sense VSS 148 would be a scaled version of the secondary winding voltage $V_S$ 109 and either in-phase or out-of-phase depending from which end of the secondary winding 108 the resistor divider or other scaling circuit is coupled.

Switching sense 136 is coupled to receive the secondary voltage sense VSS 148 and outputs the sensed drive signal SDR 150. The switching sense 136 determines one or more switching parameters of the power switch SP 110. These switching parameters could include: when the power switch SP 110 turns on, when the power switch SP 110 turns off, the duration of the on-time, and/or the duration of the off-time. In other words, the switching sense 136 allows the second controller 130 to derive the switching parameters of the power switch SP 110 from the secondary voltage sense VSS 148. In one example, the sensed drive signal SDR 150 is representative of one or more switching parameters of the power switch SP 110. In another example, the sensed drive signal SDR 150 is representative of the drive signal DR 170.

Timer 138 is coupled to receive the sensed drive signal SDR 150 from the switching sense 136 and the request signal REQ 146 from request control 134. As shown, the request signal REQ 146 is received at a start input of the timer 138 while the sensed drive signal SDR 150 is received at a stop input of timer 138. Timer 138 measures the communication delay TCD 169 inserted by the first controller 154. In other words, the timer 138 determines the communication delay TCD 169 by measuring the time between sending a request event 172 in the request signal REQ 146 and the sensed switching property of the power switch SP 110. The timer 138 outputs the measured time as the sensed communication delay SCD 152. Although a timer 138 is shown, it should be appreciated that a counter could also be used.

For example, switching sense 136 may sense when the power switch SP 110 turns ON (ergo the sensed drive signal SDR 150 is representative of when the power switch SP 110 turns on). As such, the timer 138 measures the time between a request event 172 and the sensed turn ON of the power switch SP 110. In another example, the switching sense 136 may sense when the power switch SP 110 turns OFF (ergo the sensed drive signal SDR 150 is representative of when the power switch SP 110 turns off). As such, the timer 138 measures the time between a request event 172 and the sensed turn OFF of the power switch SP 110. In a further example, the switching sense 136 may sense the drive signal DR 170 (ergo the sensed drive signal SDR 150 is representative of the drive signal DR 170). As such, the timer 138 can measure the time between a request event 172 and either the turn ON or turn OFF of power switch SP 110. These examples will be further discussed with respect to FIGS. 3A, 3B, and 3C.

Reference generator is coupled to receive the sensed communication delay SCD 152 from the timer 138 and outputs the reference REF 142. In operation, the reference generator 140 varies the reference REF 142 utilized for regulation of the output sense signal OS 128 in response to the sensed communication delay SCD 152. In one example, the reference REF 142 may be substantially constant for sensed communication delays SCD 152 below a threshold SCDTH. For sensed communication delays SCD 152 above a threshold, the reference REF 142 generally decreases as the sensed communication delay SCD 152 increases, as shown in FIG. 5C.

As such, the first controller 154 communicates to the second controller 130 by inserting a communication delay TCD 169 prior to turning ON the power switch SP 110, in accordance with embodiments of the present disclosure. The second controller 130 senses and measures the communication delay TCD 169 from the secondary winding 108 of the energy transfer element T1 104. Further, the second controller 130 can respond to the sensed communication delay SCD 152 by varying the reference REF 142 for the output of the power converter 100.

Figure 2A:
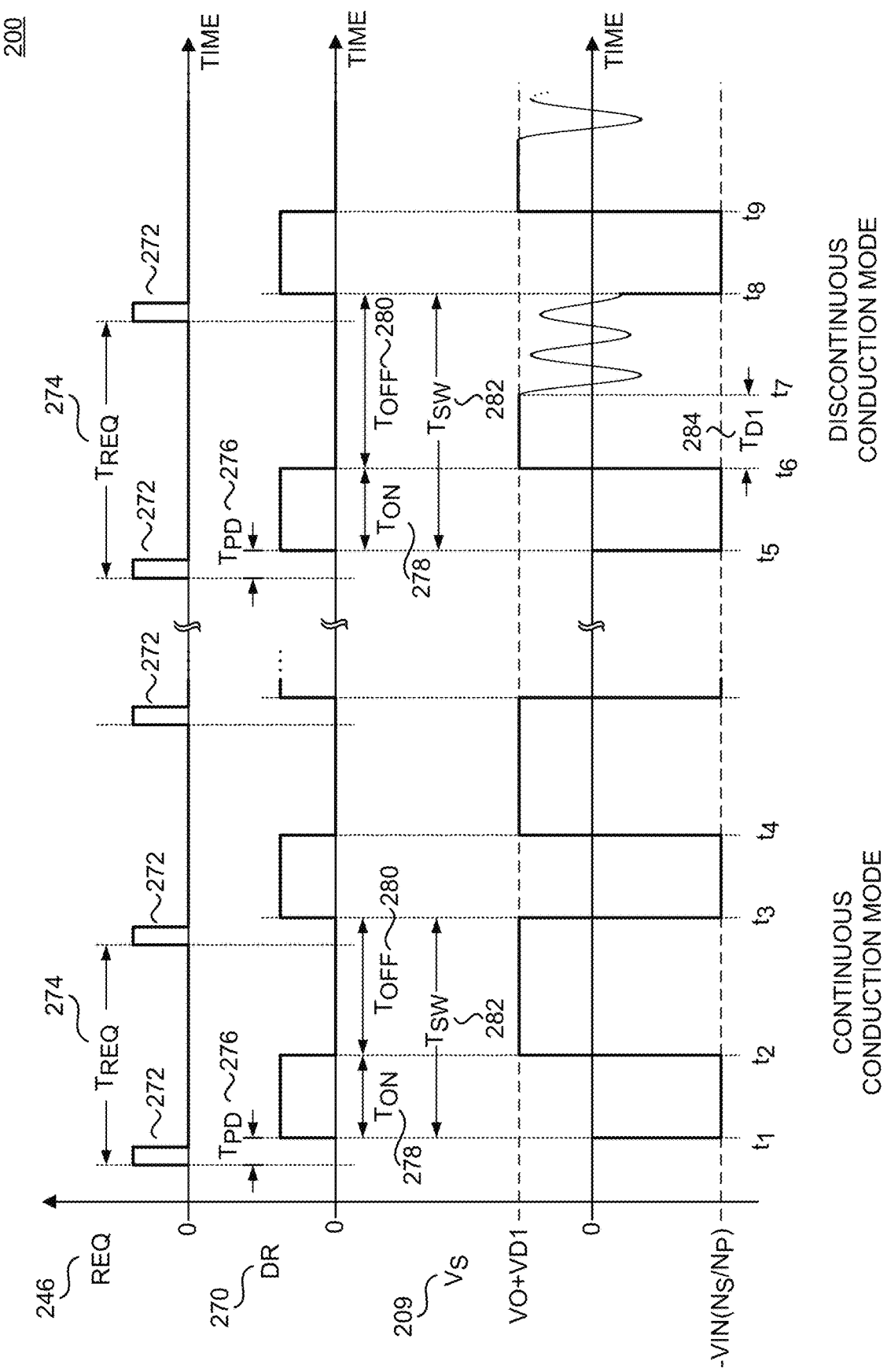
FIG. 2A is a timing diagram illustrating the waveforms for various signals of FIG. 1 without a communication delay in accordance with embodiments of the present disclosure.

FIG. 2A illustrates a timing diagram 200 of the request signal REQ 246, drive signal DR 270, and secondary voltage $V_S$ 209, which are examples of the request signal REQ 146, drive signal DR 170, and secondary voltage $V_S$ 109 shown in FIG. 1. The timing diagram 200 illustrates the power converter operating in both continuous conduction mode (CCM) and discontinuous conduction mode (DCM). In addition, the timing diagram 200 illustrates examples for the request signal REQ 246, drive signal DR 270, and secondary voltage VS 209 when there is no communication delay TCD 269 inserted by the first controller 154.

The left hand side of the timing diagram 200 illustrates request signal REQ 246, drive signal DR 270, and secondary voltage $V_S$ 209 when the power converter is operating in CCM. The request signal REQ 246 pulses to a logic high value and then quickly returns to the logic low value. The pulses 272 are also referred to as request events and the time between leading or trailing edges of the request events 272 is the request period $T_{REQ}$ 274. As mentioned above, request events 272 indicate to the first controller 154 to turn ON the power switch SP 110. In response to the request event 272, the drive signal DR 270 transitions to a logic high value to turn ON the power switch SP 110 after a propagation delay $T_{PD}$ 276 (times $t_1$ and $t_3$). The propagation delay $T_{PD}$ 276 is representative of the time to transmit the request event 272 from the second controller 130 to the first controller 154 and the delays of various circuits within both. When the power switch SP 110 is ON, the secondary voltage $V_S$ 209 is substantially equal to the negative of the input voltage $V_{IN}$ 102 multiplied by the secondary winding 108 $N_S$ to primary winding 106 $N_P$ turns ratio of the energy transfer element T1 104, or mathematically:

$$V_S = -V_{IN}\frac{N_S}{N_P} \quad (1)$$

The transition of the secondary voltage $V_S$ 209 at time $t_1$ and $t_3$ (and time $t_5$ and $t_8$ for DCM) can be sensed by the second controller 130 to determine the start of the on-time $T_{ON}$ 278 of the drive signal DR 270 and the power switch SP 110. The drive signal DR 270 transitions to the logic low value to turn OFF the power switch SP 110 at times $t_2$ and $t_4$. As shown, the duration of time which the drive signal DR 270 is logic high corresponds with the on-time $T_{ON}$ 278 of the power switch SP while the duration of time which the drive signal DR 270 is logic low corresponds with the off-time $T_{OFF}$ 280 of the power switch SP. However, it should be appreciated that the logic could be reversed and a logic low value of the drive signal DR 270 could correspond to a power switch which is ON and a logic high value could correspond to a power switch which is OFF. The sum of the on-time $T_{ON}$ 278 and the off-time $T_{OFF}$ 280 is referred to as the switching period $T_{SW}$ 282 of the power switch SP 110. In other words, the switching period $T_{SW}$ 282 may be the time between leading edges or trailing edges of the drive signal DR 270.

When the power switch SP 110 turns off, the secondary voltage $V_S$ 209 increases to substantially the sum of the output voltage $V_O$ and the voltage $V_{D1}$ across the output rectifier D1 shown in FIG. 1, or mathematically:

$$V_S = V_O V_{D1} \quad (2)$$

The transition of the secondary voltage $V_S$ 209 at time $t_2$ and $t_4$ (and $t_6$ and $t_9$ for DCM) can also be sensed by the second controller 130. During CCM, the energy stored by the energy transfer element T1 is not completely delivered during each switching period $T_{SW}$ 282. As such, the output rectifier D1 114 is conducting during the entirety of the off-time $T_{OFF}$ 280 and the secondary voltage $V_S$ 209 is substantially equal to the sum of the output voltage $V_O$ and the voltage $V_{D1}$ across the output rectifier D1 during the entirety of the off-time $T_{OFF}$ 280.

The right hand side of timing diagram 200 illustrates request signal REQ 246, drive signal DR 270, and secondary voltage $V_S$ 209 when the power converter is operating in DCM. The example waveforms for the request signal REQ 246 and drive signal DR 270 for DCM are similar to the examples shown for their CCM counterparts. However, during DCM the energy stored by the energy transfer element T1 104 is completely delivered during each switching period $T_{SW}$ 282. Or in other words, during DCM the energy from the secondary winding 108 is depleted. As such, the output rectifier D1 is not conducting during the entirety of the off-time $T_{OFF}$ 280. As shown on the right hand side of the timing diagram 200, the drive signal DR 270 transitions to a logic low value (at times $t_6$ and $t_9$) to turn OFF the power switch SP 110. When the power switch SP 110 turns off, the secondary voltage $V_S$ 209 increases to substantially the sum of the output voltage $V_O$ 120 and the voltage $V_{D1}$ across the output rectifier D1 114 ($V_S=V_O+V_{D1}$). The secondary voltage $V_S$ 209 remains at this value while the output rectifier D1 114 is conducting. The output rectifier D1 114 stops conducting when the current from the secondary winding 108 of the energy transfer element T1 104 falls to zero. Or in other words, the output rectifier D1 114 stops conducting when the energy has been depleted from secondary winding 108. The duration of the output rectifier D1 114 conduction time is illustrated as duration $T_{D1}$ 284. After the conduction time $T_{D1}$ 284, the secondary voltage $V_S$ 209 rings (between times $t_7$ to $t_8$). When the drive signal DR 270 turns ON the power switch SP 110 at time $t_8$, the secondary voltage $V_S$ 209 decreases to the negative input voltage $V_{IN}$ multiplied by the turns ratio of the secondary winding 108 to primary winding 106 of the energy transfer element T1 104

$$\left(V_s = -V_{IN}\frac{N_S}{N_P}\right).$$

As illustrated, transitions in the secondary winding voltage $V_S$ 209 occur when the power switch S1 110 is turned ON or OFF. As such, the second controller 130 can sense the secondary winding voltage $V_S$ 209 to determine the start of the on-time $T_{ON}$, the start of the off-time $T_{OFF}$, duration of the on-time $T_{ON}$, and/or the duration of the off-time $T_{OFF}$. In other words, the secondary winding $V_S$ 209 may be utilized to determine the switching parameters of the power switch SP 110 and/or the drive signal DR 270.

Figure 2B:
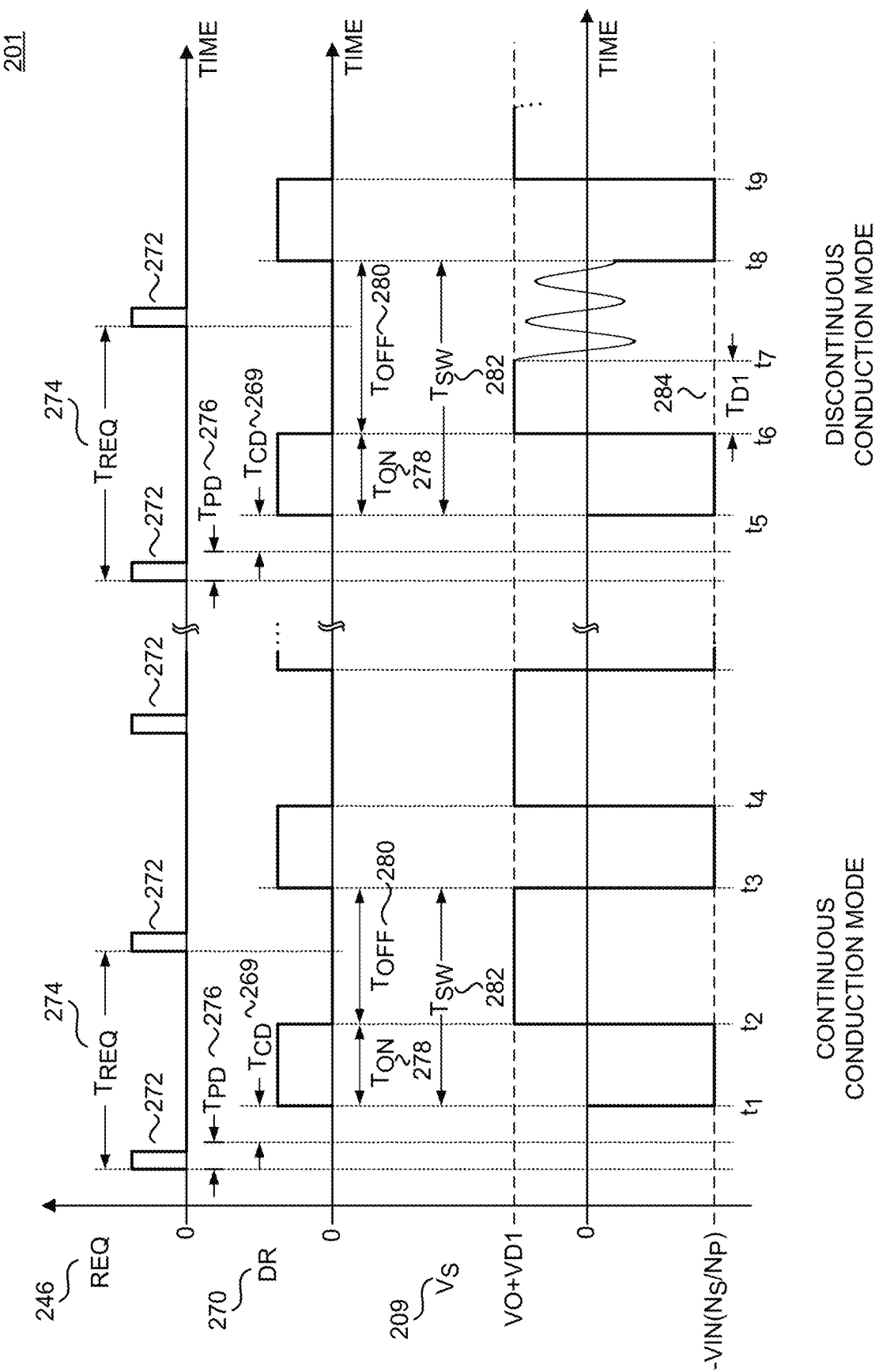
FIG. 2B is a timing diagram illustrating the waveforms for various signals of FIG. 1 with the communication delay in accordance with embodiments of the present disclosure.

FIG. 2B illustrates a timing diagram 201 of the request signal REQ 246, drive signal DR 270, and secondary voltage $V_S$ 209, which are examples of the request signal REQ 146, drive signal DR 170, and secondary voltage $V_S$ 109 shown in FIG. 1. The waveforms shown in timing diagram 201 is similar to the waveforms shown in timing diagram 200 shown in FIG. 2A, however the timing diagram 201 illustrates the request signal REQ 246, drive signal DR 270, and secondary voltage VS 209 for both CCM and DCM when there is communication delay TCD 269 inserted by the first controller 154.

For both CCM and DCM operation, the drive signal DR 270 turns ON the power switch S1 110 in response to a request event 272 of the request signal REQ 246. However, as shown in FIG. 2B, the drive signal DR 270 transitions to a logic high value to turn ON the power switch S1 110 after a propagation delay $T_{PD}$ 276 and a communication delay $T_{CD}$ 269 have elapsed (times $t_1$ and $t_3$). As mentioned above, the propagation delay $T_{PD}$ 276 is representative of the time to transmit the request event 272 from the second controller 130 to the first controller 154 and the delays of various circuits within both. The communication delay $T_{CD}$ 269 is representative of information which the first controller 154 is transmitting to the second controller 130. Similar to above, transitions in the secondary voltage $V_S$ 209 can be sensed when the power switch SP 110 turns ON and OFF. When the power switch SP 110 turns ON (times $t_1$, $t_3$, $t_5$, $t_8$), the secondary voltage $V_S$ 209 transitions to the negative of input voltage $V_{IN}$ 102 multiplied by the secondary winding 108 $N_S$ to primary winding 106 $N_P$ turns ratio of the energy transfer element T1 104

$$\left(V_s = -V_{IN}\frac{N_S}{N_P}\right).$$

When the power switch SP 110 turns OFF (times $t_2$, $t_4$, $t_6$, $t_9$), the secondary voltage $V_S$ 209 transitions to the sum of the output voltage $V_O$ 120 and the voltage $V_{D1}$ across the output rectifier D1 114 ($V_S=V_O+V_{D1}$).

As mentioned above, the second controller 130 can sense the secondary winding $V_S$ 209 to determine the start of the on-time $T_{ON}$, start of the off-time $T_{OFF}$, duration of the on-time $T_{ON}$, and/or the duration of the off-time $T_{OFF}$. Under steady-state conditions, the propagation delay $T_{PD}$ 276 is substantially a fixed value. By sensing the transitions of the secondary winding voltage $V_S$ 209, the second controller 130 can measure the time between sending a request event 272 and either the turn ON or turn OFF of power switch SP 110. As such, the second controller 130 can sense when there is a communication delay $T_{CD}$ 269 inserted by the first controller 154. Further, the second controller can determine the duration of the communication delay $T_{CD}$ 269.

Figure 3A:
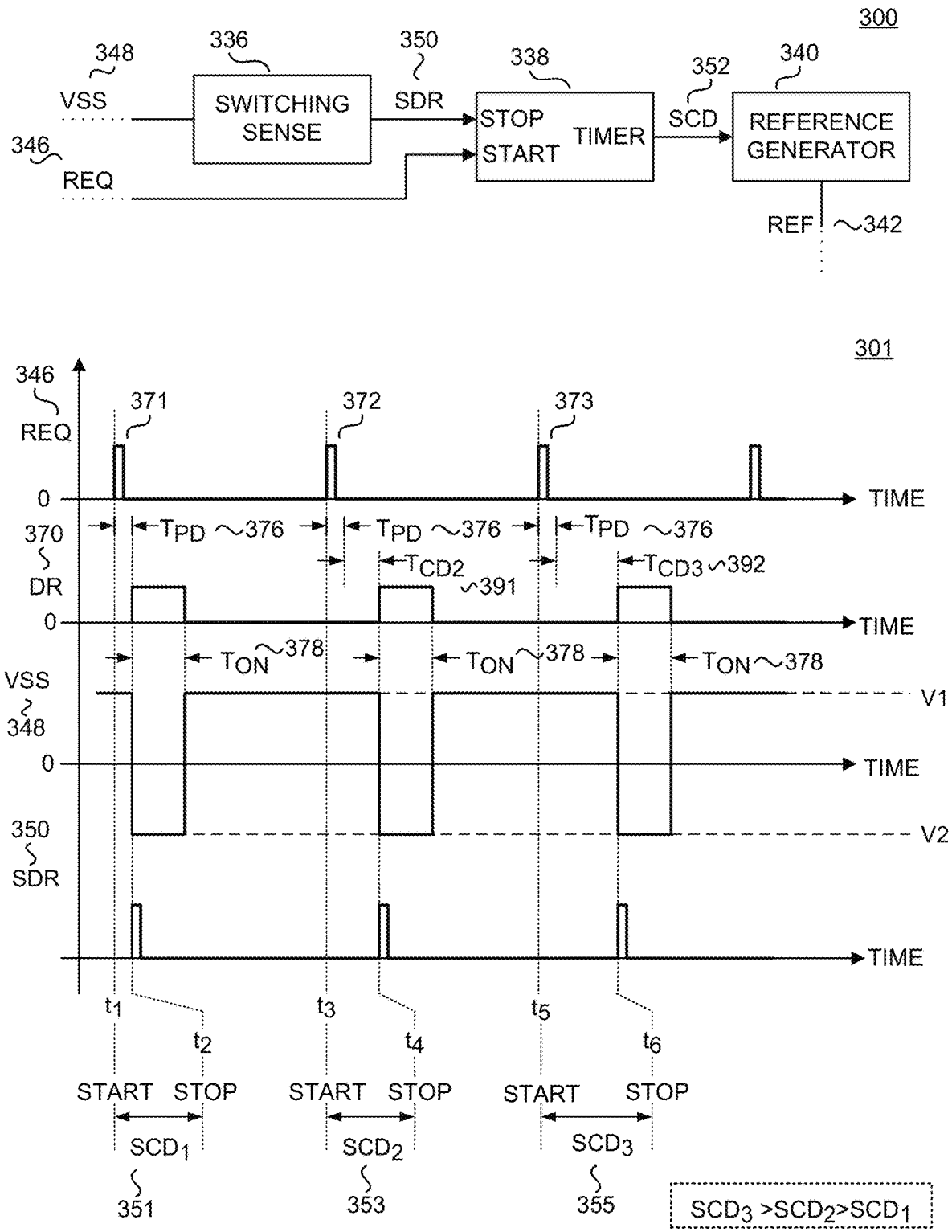
FIG. 3A illustrates a functional block diagram of a switching sense, timer, and reference generator of the second controller of FIG. 1 and a timing diagram illustrating waveforms of the corresponding signals in accordance with embodiments of the present disclosure.
Figure 3B:
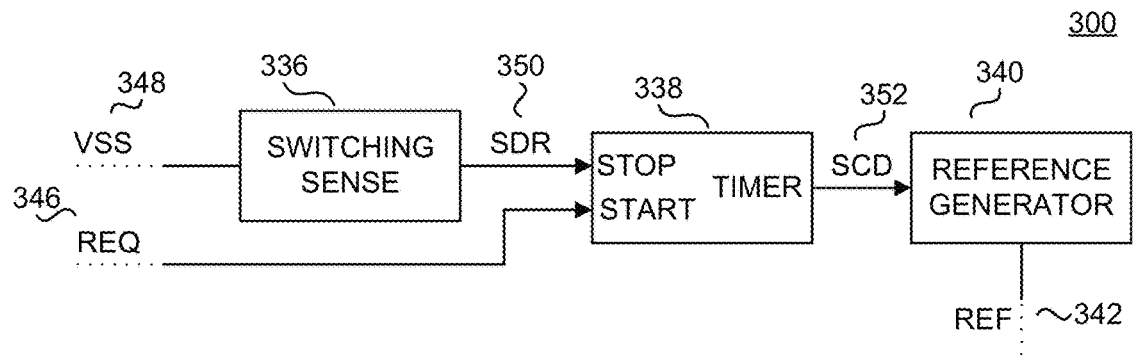
FIG. 3B illustrates a functional block diagram of a switching sense, timer, and reference generator of the second controller of FIG. 1 and another timing diagram illustrating waveforms of the corresponding signals in accordance with embodiments of the present disclosure.
Figure 3B:
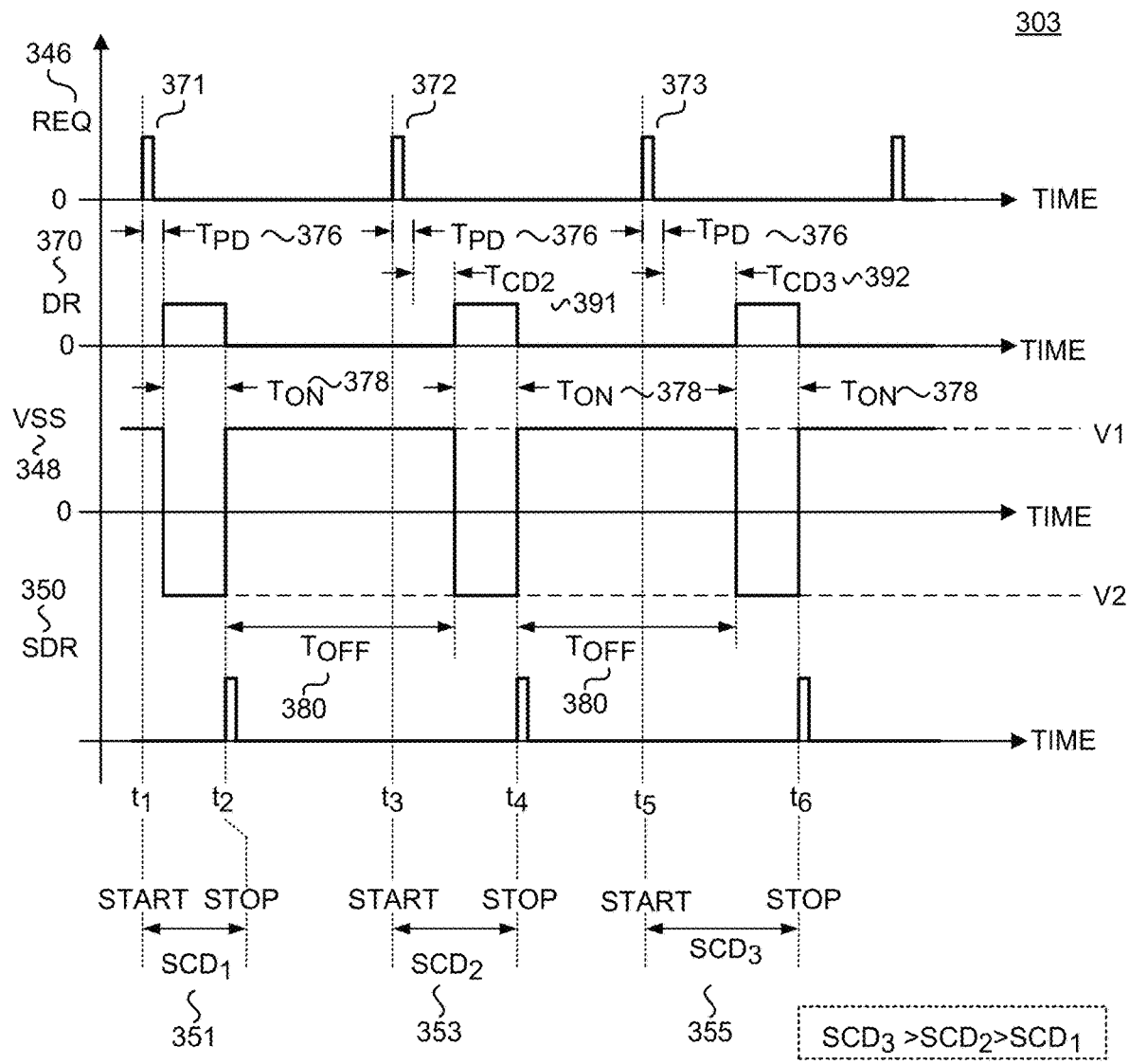
Figure 3C:
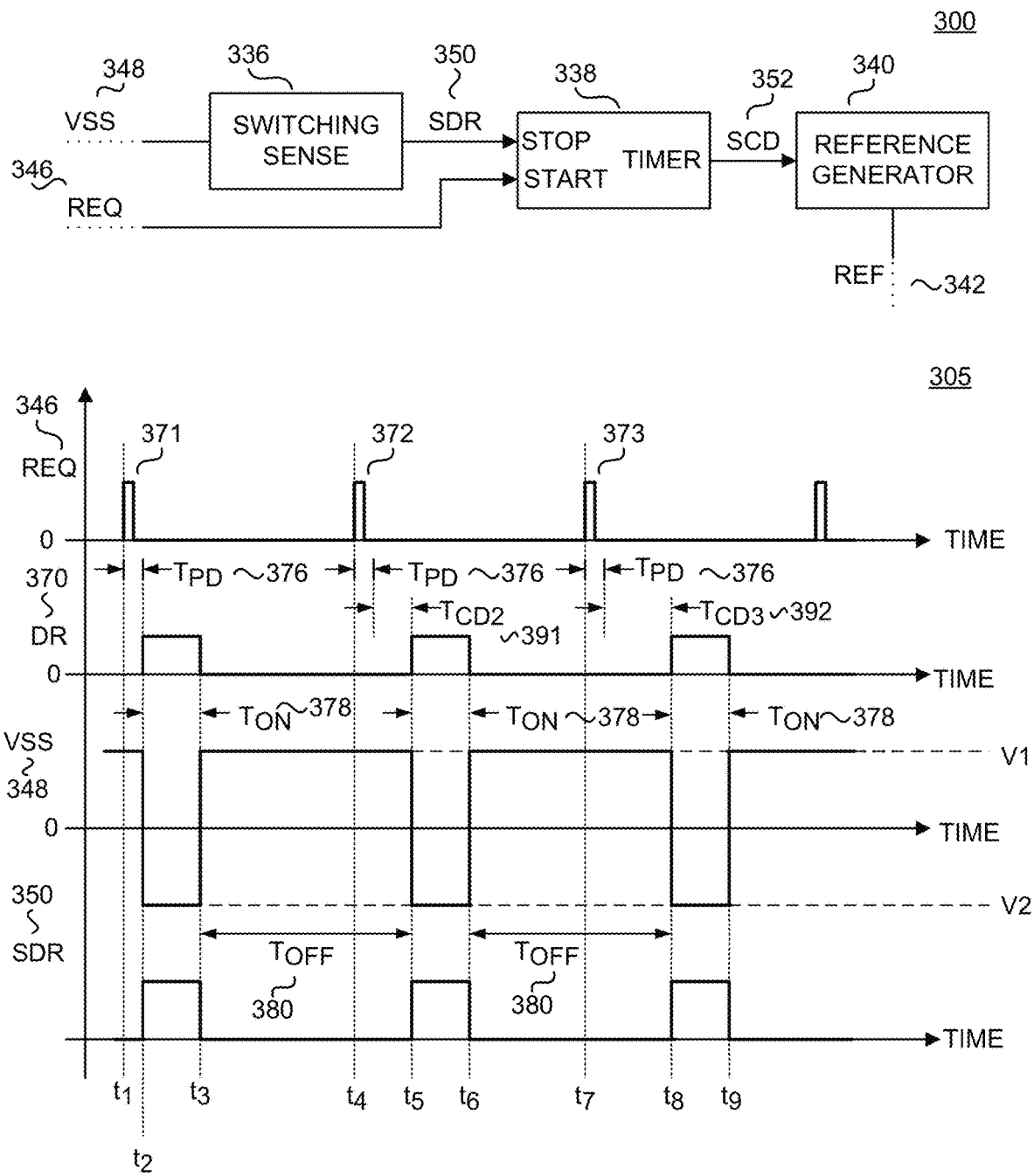
FIG. 3C illustrates a functional block diagram of a switching sense, timer, and reference generator of the second controller of FIG. 1 and a further timing diagram illustrating waveforms of the corresponding signals in accordance with embodiments of the present disclosure.

FIGS. 3A, 3B and 3C illustrate timing diagrams 301, 303, 305, respectively, of the request signal REQ 346, drive signal DR 370, secondary voltage sense VSS 348, and sensed drive signal SDR 350. FIG. 3A illustrates an example sensed drive signal SDR 350 representative of the start of the on-time $T_{ON}$ 378 of the power switch SP 110 and the resultant sensed communication delay SCD. FIG. 3B illustrates an example sensed drive signal SDR 350 representative of start of the off-time $T_{OFF}$ 380 (or end of the on-time $T_{ON}$ 378) and the resultant sensed communication delay SCD. FIG. 3C illustrates an example sensed drive signal SDR 350 representative of the on-time $T_{ON}$ 378. Further, FIGS. 3A, 3B, and 3C each illustrate a functional block diagram 300 the switching sense 336, timer 338, and reference generator 340 as a reference for the timing diagrams 301, 303, and 305. It should be appreciated that similarly named and numbered elements couple and function as described above.

The request signal REQ 346 pulses to a logic high value and then quickly returns to the logic low value. The pulses are also referred to as request events. Timing diagrams 301, 303 and 305 illustrate request events (i.e. pulses) 371, 372 and 373. Request events indicate to the first controller 154 to turn ON the power switch SP 110. In response to the request events 371, 372, 373, the drive signal DR 370 transitions to a logic high value to turn ON the power switch SP 110. After request event 371, the drive signal DR 370 transitions to a logic high value after a propagation delay $T_{PD}$ 376. After request event 372, the drive signal DR 370 transitions to a logic high value after the propagation delay $T_{PD}$ 376 and communication delay $T_{CD2}$ 391. Further, after request event 373, the drive signal DR 370 transitions to a logic high value after the propagation delay $T_{PD}$ 376 and communication delay $T_{CD3}$ 392. For the example shown, the duration of communication delay $T_{CD3}$ 392 is longer than the duration of communication delay $T_{CD2}$ 391.

The example secondary voltage sense VSS 348 shown in FIGS. 3A, 3B, and 3C is for a power converter operating in CCM and is substantially equal to voltage V2 during the on-time $T_{ON}$ 378 and substantially equal to voltage V1 during the off-time $T_{OFF}$ 380. The example secondary voltage sense VSS 348 shown in timing diagrams 301, 303 and 305 are in-phase with the voltage across the power switch SP 110, however, and out-of-phase secondary voltage sense VSS could also be utilized. A resistor divider or other scaling circuit could be used to provide the secondary voltage sense VSS 348. As such, the secondary voltage sense VSS 348 would be a scaled version of the secondary winding voltage $V_S$. For example, voltage V1 would be a scaled version of the negative of the input voltage multiplied by the turns ratio of the energy transfer element $$\left(V_1 = -AV_{IN}\frac{N_S}{N_P}\right)$$

and voltage V2 would be scaled versions of the sum of the output voltage and the diode voltage ($V_S=A(V_O+V_{D1})$), with "A" as the scaling factor. However, the secondary voltage sense VSS 348 could be provided directly from the secondary winding 108. As such, the voltage V1 would be the negative of the input voltage multiplied by the turns ratio of the energy transfer element $$\left(V_1 = -V_{IN}\frac{N_S}{N_P}\right)$$

and voltage V2 would be the sum of the output voltage and the diode voltage ($V_S=(V_O+V_{D1})$).

Switching sense 336 is coupled to receive the secondary voltage sense VSS 348 representative of the secondary winding voltage $V_S$ 109 and outputs the sensed drive signal SDR 350. The switching sense 336 determines one or more switching parameters of the power switch SP 110. These switching parameters could include when the power switch SP 110 turns ON, when the power switch SP 110 turns OFF, the duration of the on-time, and/or the duration of the off-time. In other words, the switching sense 336 allows the second controller 130 to derive the switching parameters of the power switch SP 110 from the secondary voltage sense VSS 348.

The timer 338 is coupled to receive the request signal REQ 346 at its START input and the sensed drive signal SDR 350 at its STOP input. Timer 338 senses and measures the communication delay TCD inserted by the first controller 154. In other words, the timer 338 measures the time between sending a request event 371, 372, 373 in the request signal REQ 346 and the sensed switching property of the power switch SP 110. As shown, the timer 338 begins timing in response to request events 371, 372, and 373 and stops timing in response to the sensed drive signal SDR 350. The timer 338 outputs the measured time as the sensed communication delay signal SCD 352. Although a timer 338 is shown, it should be appreciated that a counter could also be used.

For the example shown in FIG. 3A, the switching sense 336 outputs a sensed drive signal SDRDR 350 representative of when the power switch SP 110 turns ON. In other words, the sensed drive signal SDR 350 is representative of the start of the on-time $T_{ON}$ 378. In response to the downward transition of the secondary voltage sense VSS 348 at times $t_2$, $t_4$, and $t_6$, corresponding to turning ON the power switch SP 110, the sensed drive signal SDR 350 transitions to a logic high value. As shown in FIG. 3A, the sensed drive signal SDR 350 pulses to a logic high value and then quickly returns to the logic low value.

For the example shown in FIG. 3B, the switching sense 336 outputs a sensed drive signal SDR 350 representative of when the power switch SP 110 turns OFF. In other words, the sensed drive signal SDR 350 is representative of the start of the off-time $T_{OFF}$ 380 (or the end of the on-time $T_{ON}$ 378). In response to the upward transition of the secondary voltage sense VSS 348 at times $t_2$, $t_4$, and $t_6$, corresponding to turning OFF the power switch SP 110, the sensed drive signal SDRDR 350 transitions to a logic high value. As shown in FIG. 3B, the sensed drive signal SDR 350 pulses to a logic high value and then quickly returns to the logic low value at the beginning of the off-time $T_{OFF}$ 380.

For the example shown in FIG. 3C, the switching sense 336 outputs a sensed drive signal SDRDR 350 representative of the on-time $T_{ON}$ 378. However, the sensed drive signal SDR 350 could also be representative of the off-time $T_{OFF}$ 380. In response to the downward transition of the secondary voltage sense VSS 348 at times $t_2$, $t_5$, and $t_8$, corresponding to turning ON the power switch SP 110, the sensed drive signal SDRDR 350 transitions to a logic high value. In response to the upward transition of the secondary voltage sense VSS 348 at times $t_3$, $t_6$, and $t_9$, corresponding to turning OFF the power switch SP 110, the sensed drive signal SDR 350 transitions to a logic high value. As such, the sensed drive signal SDR 350 mirrors the drive signal DRDR 370.

In operation, timer 338 begins timing in response to request event 371, 377 and 373 and stops timing in response to the sensed drive signal SDR 350. For the example shown in FIG. 3A, the sensed drive signal SDR 350 is representative of turning ON the power switch SP 110 at times $t_2$, $t_4$, and $t_6$. The measured times are outputted as sensed communication delays $SCD_1$ 351, $SCD_2$ 353 and $SCD_3$ 355, respectively, to the reference generator 340. The first switching cycle after request event 371 illustrates an example of no communication delay, while the switching cycles after request events 372 and 373 illustrate examples of increasing communication delays. In the example of FIG. 3A, the sensed communication delay $SCD_3$ 355 is greater than sensed communication delay $SCD_2$ 353, which is greater than sensed communication delay $SCD_1$ 351. In one example, the measured sensed communication delay $SCD_1$ 351 is the measured duration which corresponds to no inserted communication delay TCD by the first controller 154. As such, measured sensed communication delays less than or equal to the sensed communication delay $SCD_1$ 351 corresponds to no inserted communication delay TCD.

For the example shown in FIG. 3B, the sensed drive signal SDRDR 350 is representative of turning OFF the power switch SP 110 at times $t_2$, $t_4$, and $t_6$. Similarly to the example shown in FIG. 3A, the measured times are outputted as sensed communication delays $SCD_1$ 351, $SCD_2$ 353 and $SCD_3$ 355, respectively, to the reference generator 340. The first switching cycle after request event 371 illustrates an example of no communication delay, while the switching cycles after request events 372 and 373 illustrate examples of increasing communication delays. The sensed communication delay $SCD_3$ 355 is greater than sensed communication delay $SCD_2$ 353, which is greater than sensed communication delay $SCD_1$ 351. The measured sensed communication delay SCD1 351 is the measured duration which corresponds to no inserted communication delay TCD by the first controller 154. As such, measured sensed communication delays less than or equal to the sensed communication delay SCD1 351 corresponds to no inserted communication delay TCD.

In the example shown in FIG. 3C, the sensed communication delay is not explicitly illustrated. The timer 338 could stop timing at either the leading edges of the sensed drive signal SDR 350 at times $t_2$, $t_5$, and $t_8$, corresponding to turning ON the power switch SP 110 (as shown in FIG. 3A), or the trailing edges of the sensed drive signal SDR 350 at times $t_3$, $t_6$, and $t_9$, corresponding to turning OFF the power switch SP 110 (as shown in FIG. 3B).

Reference generator 340 receives the sensed communication delay signal SCD 352 (which SCD1 351, SCD2 353 and SCD3 354 are examples of measure durations of the sensed communication delay SCD) and varies the reference REF 342. As will be further discussed, the reference REF 342 may be substantially constant for sensed communication delays SCD 352 below a threshold SCDTH. For sensed communication delays SCD 352 above a threshold, the reference REF 342 generally decreases as the sensed communication delay SCD 352 increases. As such, the first controller 154 communicates to the second controller 130 by inserting a communication delay prior to turning ON the power switch SP 110, in accordance with embodiments of the present disclosure. The second controller 130 senses and measures the communication delay from the secondary winding 108 of the energy transfer element T1 104. Further, the second controller 130 can respond to the sensed communication delay 352 by varying the reference REF 342 for the output of the power converter 100.

FIG. 4A is a graph 400 illustrating the relationship between temperature 462 of one or more components on the primary side of the power converter 100 and the reference REF 442. Reference REF 442 is one example of reference 342 and 142 discussed above. In the example shown, the reference REF 442 is substantially a constant non-zero value for temperatures 462 less than a temperature threshold TTH 463. In some examples, the temperature threshold TTH 463 could be substantially 100° C., 110° C., or 120° C. Temperature 462 may be the temperature of the power switch SP 110 and the temperature threshold TTH 463 may be selected based on the thermal characteristics of power switch SP 110. For temperatures greater than the temperature threshold TTH 463, the reference REF 442 decreases as the temperature 462 increases. In one example, large dashed line 486 illustrates the reference REF 442 linearly decreasing with increasing temperature 462. In another example, medium dashed line 488 illustrates the reference REF 442 exponentially decreasing with increasing temperature 462. However, small dashed line 490 is included to illustrate that any decreasing relationship may be utilized. In one example, there is a one-to-one relationship between the reference REF 442 and the temperature 462. In one example, decreasing reference REF 442 corresponds to reduced output delivery of the power converter. As such, if the temperature rises to an unsafe value, the first controller can communicate the temperature via the communication delay to the second controller. In response to the communicated temperature, the second controller may reduce power delivery, which may then lower the temperature and/or protect components from overheating.

FIG. 4B is a graph 401 illustrating the relationship between the input voltage $V_{IN}$ 402 of the power converter 100 and a reference REF 442. Input voltage $V_{IN}$ 402 is one example of input voltage $V_{IN}$ 102 discussed above. In the example shown, the reference REF 442 is substantially a constant non-zero value for input voltages $V_{IN}$ 402 above an input voltage threshold VINTH 465. In one example, the input voltage threshold VINTH 465 may be substantially equal to 80 volts (V). In another example, the input voltage threshold VINTH 465 may be selected based on the voltage stress properties of the power switch SP 110. For input voltages $V_{IN}$ 402 below the input voltage threshold VINTH 465, the reference REF 442 substantially decreases as the input voltages $V_{IN}$ 402 decreases. In one example, large dashed line 486 illustrates the reference REF 442 linearly decreasing with decreasing input voltage $V_{IN}$ 402. In another example, medium dashed line 488 illustrates the reference REF 442 exponentially decreasing with decreasing input voltages $V_{IN}$ 402. However, small dashed line 490 is included to illustrate that any decreasing relationship may be utilized. In one example, there is a one-to-one relationship between the reference REF 442 and the input voltages $V_{IN}$ 402. In one example, a decreasing reference REF corresponds to reduced output delivery of the power converter. In another example, if the input voltage $V_{IN}$ falls, the power converter may begin to overwork to compensate for the lower input voltage $V_{IN}$, which may damage components. The first controller may communicate the value of the input voltage $V_{IN}$ to the second controller via the communication delay, the second controller may reduce output delivery in response to the communicated input voltage $V_{IN}$, which may protect the components of the power converter.

FIG. 5A is a graph 500 which illustrates the relationship between temperature 562 of one or more components on the primary side of the power converter 100 and the communication delay TCD 569. As mentioned above, the communication delay TCD 569 refers to the inserted delay prior to turning on the power switch S1 110 which the first controller 154 utilizes to send information to the second controller 130. Further, the first controller 154 may vary the length of the communication delay TCD 569 to send information to the second controller 130.

As shown, the length of the communication delay TCD 569 is substantially zero for temperatures 562 below the temperature threshold TTH 563. Temperature threshold TTH 563 may correspond to the temperature threshold TTH 463 discussed above. For temperatures 562 above the temperature threshold TTH 563, the communication delay TCD 569 substantially increases as the temperature 562 increases. In one example, the dashed line 586 illustrates the communication delay TCD 569 increasing linearly with increasing temperature 562. In another example, dotted line 588 illustrates the increase of the communication delay TCD 569 as an increasing step function with increasing temperature 562. As compared to FIG. 4A, for temperatures 562 above the temperature threshold TTH 563, the relationship of the reference REF to temperature is opposite to the relationship of the communication delay TCD 569 to temperature. In other words, for temperatures 562 above the temperature threshold TTH 563, the reference REF decreases with increasing the communication delay TCD 569.

FIG. 5B is a graph 501 which illustrates the relationship between the input voltage $V_{IN}$ 502 of the power converter 100 and the communication delay TCD 569. Input voltage $V_{IN}$ 502 is one example of input voltage $V_{IN}$ 102 discussed above. In the example shown, communication delay TCD 569 is substantially zero for input voltages $V_{IN}$ 502 above an input voltage threshold VINTH 565. It should be appreciated that input voltage threshold VINTH 565 corresponds with input voltage threshold VINTH 465 discussed above. For input voltages $V_{IN}$ 502 below the input voltage threshold VINTH 565, the communication delay TCD 569 substantially decreases as the input voltages $V_{IN}$ 502 increases. In one example, dashed line 586 illustrates the communication delay TCD 569 linearly decreasing with increasing input voltage $V_{IN}$ 402. In another example, dotted line 588 illustrates the decrease of communication delay TCD 569 as a decreasing step function with increasing input voltages $V_{IN}$ 402. As compared to FIG. 4B, for input voltages $V_{IN}$ 502 below the input voltage threshold VINTH 565, relationship of the reference REF to input voltages $V_{IN}$ 502 is opposite to the relationship of the communication delay TCD 569 to input voltages $V_{IN}$ 502. In other words, for input voltages $V_{IN}$ 502 below the input voltage threshold VINTH 565, the reference REF decreases with increasing the communication delay TCD 569.

FIG. 5C is a graph 503 which illustrates the relationship between the sensed communication delay SCD 552 and the reference REF 142 utilized for regulation of the output of the power converter 100. The reference REF 542 is substantially a constant non-zero value for sensed communication delays SCD 552 below a threshold SCDTH 557. For sensed communication delays SCD 552 above a threshold, the reference REF 542 generally decreases as the sensed communication delay SCD 552 increases. In one example, dashed line 586 illustrates the reference REF 542 linearly decreasing with increasing sensed communication delay SCD 552. In another example, dotted line 588 illustrates the decrease of reference REF 542 as a decreasing step function with increasing input sensed communication delay SCD 552. Further, the threshold SCDTH 557 may correspond to the temperature threshold TTH 563 and the input voltage threshold VINTH 565. As such, the first controller 154 communicates to the second controller 130 by inserting a communication delay TCD 569 prior to turning ON the power switch SP 110, in accordance with embodiments of the present disclosure. The second controller 130 senses and measures the communication delay TCD 569 from the secondary winding 108 of the energy transfer element T1 104. Further, the second controller 130 can respond to the sensed communication delay SCD 552 by varying the reference REF 542 for the output of the power converter 100.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it should appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A controller for use in a power converter, comprising: a first controller coupled to a primary-side of the power converter and configured to control switching of a power switch of the power converter to transfer energy from the primary-side to a secondary-side of the power converter, wherein the first controller includes: a communication delay generator configured to receive a first signal, wherein the communication delay generator determines a communication delay in response to the first signal and outputs a communication signal representative of the communication delay; and a drive circuit coupled to the communication delay generator and configured to receive a request signal, wherein the request signal includes a request event to turn ON the power switch and outputs a drive signal to turn ON the power switch in response to the request event, wherein the drive circuit is further configured to receive the communication signal and responsive to the communication signal, delays the turn ON of the power switch by the communication delay.

Example 2. The controller of example 2, wherein the first signal is representative of a temperature of one or more components on the primary-side of the power converter.

Example 3. The controller of example 3, wherein the communication delay is substantially zero when the temperature is less than a temperature threshold and the communication delay increases as temperature increases when the temperature is greater than the temperature threshold.

Example 4. The controller of any one of examples 1 to 3, wherein the first signal is representative of an input voltage of the power converter.

Example 5. The controller of example 4, wherein the communication delay decreases as the input voltage increases when the input voltage is less than a threshold and the communication delay is substantially zero when the input voltage is greater than the threshold.

Example 6. The controller of example 4 or 5, wherein the communication delay is substantially equal to a first fixed duration when the input voltage is at a minimum value.

Example 7. The controller of any one of examples 4 to 6, wherein the communication delay is substantially equal to a second fixed duration when the input voltage is at a peak value.

Example 8. The controller of any one of examples 1 to 7, wherein the first signal is representative of a trim option of the first controller.

Example 9. The controller of example 8, wherein the trim option includes a current limit, a thermal foldback setting, or an enabled protection feature.

Example 10. The controller of example 8 or 9, wherein the communication delay generator receives the request signal, wherein the communication delay generator determines the communication delay in response to the trim option and outputs the communication signal in response to the request signal.

Example 11. The controller of any one of examples 1 to 10, wherein the controller further includes: a second controller coupled to the secondary-side of the power converter and configured to output a request signal in response to an output of the power converter, wherein the request signal includes the request event wherein the second controller includes: a switching sense circuit coupled to a secondary winding of the power converter and configured to sense at least one parameter of the power switch and outputs a sensed drive signal representative of the at least one parameter of the power switch from a secondary voltage of the secondary winding; and a timer coupled to the switching sense circuit and configured to receive the request signal and the sensed drive signal, wherein the timer is configured to measure a duration between the request event and the at least one parameter of the power switch to output a sensed communication delay.

Example 12. The controller of example 11, wherein the second controller further includes: a comparator coupled to receive the output of the power converter and a reference, wherein the comparator is configured to compare the output of the power converter to the reference and provide a regulation signal; a request control coupled to the comparator and configured to generate request events in the request signal in response to the regulation signal; and a reference generator coupled to the timer and configured to receive the sensed communication delay, wherein the reference generator varies the reference in response to the sensed communication delay.

Example 13. The controller of example 12, wherein the reference is a substantially constant non-zero value when the sensed communication delay is less than a sense threshold and the reference decreases as the sensed communication delay increases when the sensed communication delay is greater than the sense threshold.

Example 14. The controller of example 12 or 13, wherein the reference decreases linearly.

Example 15. The controller of example 12 or 13, wherein the reference decreases as a step function.

Example 16. The controller of any one of examples 12 to 15, wherein the reference is the substantially constant non-zero value when a temperature on the primary-side of the power converter is less than a temperature threshold and the reference substantially decreases with increasing temperature when the temperature is greater than the temperature threshold.

Example 17. The controller of any one of examples 12 to 16, wherein the reference is the substantially constant non-zero value when an input voltage is greater than a voltage threshold and the reference substantially decreases with decreasing input voltage when the input voltage is less than the voltage threshold.

Example 18. The controller of any one of examples 11 to 17, wherein the switching sense is configured to sense a beginning of an on-time of the power switch in response to a transition in the secondary voltage, and wherein the sensed drive signal is representative of the beginning of the on-time.

Example 19. The controller of any one of examples 11 to 18, wherein the timer measures the duration between the request event and the beginning of the on-time of the power switch.

Example 20. The controller of any one of examples 11 to 19, wherein the switching sense is configured to sense a beginning of an off-time of the power switch in response to a transition in the secondary voltage, wherein the sensed drive signal is representative of the beginning of the off-time.

Example 21. The controller of any one of examples 11 to 20, wherein the timer measures the duration between the request event and the beginning of the off-time off the power switch.

Example 22. The controller of any one of examples 11 to 20, wherein the sensed drive signal is representative of the drive signal of the power switch.

Example 23. The controller of any one of examples 1 to 10, wherein the drive circuit delays the turn ON of the power switch by the communication delay for every switching cycle of the power switch.

Example 24. A power conversion system, comprising: an energy transfer element coupled between a primary-side and a secondary-side of the power conversion system; a power switch coupled to a primary side of energy transfer element and an input of the power conversion system; and a first controller coupled to the power switch and configured to control switching of the power switch to control the transfer of energy by the energy transfer element, wherein the first controller includes: a communication delay generator configured to receive a first signal, wherein the communication delay generator determines a communication delay in response to the first signal and outputs a communication signal representative of the communication delay; and a drive circuit coupled to the communication delay generator and configured to receive a request signal, wherein the request signal includes a request event to turn ON the power switch and outputs a drive signal to turn ON the power switch in response to the request event, wherein the drive circuit is further configured to receive the communication signal and responsive to the communication signal, delays the turn ON of the power switch by the communication delay.

Example 25. The power conversion system of example 24, wherein the first signal is representative of a temperature of the power switch and the communication delay is substantially zero when the temperature is less than a temperature threshold and the communication delay increases as temperature increases when the temperature is greater than the temperature threshold.

Example 26. The power conversion system of example 24 or 25, wherein the first signal is representative of an input voltage of the power conversion system and the communication delay decreases as the input voltage increases when the input voltage is less than a threshold and the communication delay is substantially zero when the input voltage is greater than the threshold.

Example 27. The power conversion system of any one of examples 24 to 26, wherein the communication delay generator receives the request signal and the first signal is representative of a trim option of the first controller, wherein the communication delay generator determines the communication delay in response to the trim option and outputs the communication signal in response to the request signal.

Example 28. The power conversion system of any one of examples 24 to 27, further comprising: a second controller coupled to the energy transfer element and configured to output a request signal in response to an output of the power conversion system, wherein the request signal includes the request event and wherein the second controller includes: a switching sense circuit coupled to the energy transfer element and configured to sense at least one parameter of the power switch from the energy transfer element and outputs a sensed drive signal representative of the at least one parameter of the power switch; and a timer coupled to the switching sense circuit and configured to receive the request signal and the sensed drive signal, wherein the timer is configured to measure the time between the request event and the at least one parameter of the power switch to output a sensed communication delay.

Example 29. The power conversion system of example 28, wherein the second controller further includes: a comparator coupled to receive the output and a reference, wherein the comparator is configured to compare the output to the reference and provide a regulation signal; a request control coupled to the comparator and configured to generate the request event in the request signal in response to the regulation signal; and a reference generator coupled to the timer and configured to receive the sensed communication delay, wherein the reference generator varies the reference in response to the sensed communication delay.

Example 30. The power conversion system of example 28 or 29, wherein the switching sense is configured to sense an on-time of the power switch in response to a transition in a voltage of the energy transfer element, and wherein the sensed drive signal is representative of a beginning of the on-time.

Example 31. The power conversion system of any one of examples 28 to 30, wherein the switching sense is configured to sense the an off-time of the power switch in response to a transition in a voltage of the energy transfer element, and wherein the sensed drive signal is representative of a beginning of the off-time.

What is claimed is:

1. A controller for use in a power converter, comprising:
 a first controller coupled to a primary-side of the power converter and configured to control switching of a power switch of the power converter to transfer energy from the primary-side to a secondary-side of the power converter, wherein the first controller includes:
a communication delay generator configured to receive a first signal, wherein the communication delay generator determines a communication delay in response to the first signal and outputs a communication signal representative of the communication delay; and
a drive circuit coupled to the communication delay generator and configured to receive a request signal, wherein the request signal includes a request event to turn ON the power switch and outputs a drive signal to turn ON the power switch in response to the request event, wherein the drive circuit is further configured to receive the communication signal and responsive to the communication signal, delays the turn ON of the power switch by the communication delay; and
a second controller coupled to the secondary-side of the power converter and configured to output the request signal in response to an output of the power converter, wherein the request signal includes the request event and wherein the second controller includes:
a switching sense circuit coupled to a secondary winding of the power converter and configured to sense at least one parameter of the power switch and outputs a sensed drive signal representative of the at least one parameter of the power switch from a secondary voltage of the secondary winding; and
a timer coupled to the switching sense circuit and configured to receive the request signal and the sensed drive signal, wherein the timer is configured to measure a duration between the request event and the at least one parameter of the power switch to output a sensed communication delay.

2. The controller of claim 1, wherein the first signal is representative of a temperature of one or more components on the primary-side of the power converter.

3. The controller of claim 2, wherein the communication delay is substantially zero when the temperature is less than a temperature threshold and the communication delay increases as temperature increases when the temperature is greater than the temperature threshold.

4. The controller of claim 1, wherein the first signal is representative of an input voltage of the power converter.

5. The controller of claim 4, wherein the communication delay decreases as the input voltage increases when the input voltage is less than a threshold and the communication delay is substantially zero when the input voltage is greater than the threshold.

6. The controller of claim 4, wherein the communication delay is substantially equal to a first fixed duration when the input voltage is at a minimum value.

7. The controller of claim 4, wherein the communication delay is substantially equal to a second fixed duration when the input voltage is at a peak value.

8. The controller of claim 1, wherein the first signal is representative of a trim option of the first controller.

9. The controller of claim 8, wherein the trim option includes a current limit, a thermal foldback setting, or an enabled protection feature.

10. The controller of claim 8, wherein the communication delay generator receives the request signal, wherein the communication delay generator determines the communication delay in response to the trim option and outputs the communication signal in response to the request signal.

11. The controller of claim 1, wherein the second controller further includes:
a comparator coupled to receive the output of the power converter and a reference, wherein the comparator is configured to compare the output of the power converter to the reference and provide a regulation signal;
a request control coupled to the comparator and configured to generate request events in the request signal in response to the regulation signal; and
a reference generator coupled to the timer and configured to receive the sensed communication delay, wherein the reference generator varies the reference in response to the sensed communication delay.

12. The controller of claim 11, wherein the reference is a substantially constant non-zero value when the sensed communication delay is less than a sense threshold and the reference decreases as the sensed communication delay increases when the sensed communication delay is greater than the sense threshold.

13. The controller of claim 12, wherein the reference decreases linearly.

14. The controller of claim 12, wherein the reference decreases as a step function.

15. The controller of claim 12, wherein the reference is the substantially constant non-zero value when a temperature on the primary-side of the power converter is less than a temperature threshold and the reference substantially decreases with increasing temperature when the temperature is greater than the temperature threshold.

16. The controller of claim 12, wherein the reference is the substantially constant non-zero value when an input voltage is greater than a voltage threshold and the reference substantially decreases with decreasing input voltage when the input voltage is less than the voltage threshold.

17. The controller of claim 1, wherein the switching sense is configured to sense a beginning of an on-time of the power switch in response to a transition in the secondary voltage, and wherein the sensed drive signal is representative of the beginning of the on-time.

18. The controller of claim 17, wherein the timer measures the duration between the request event and the beginning of the on-time of the power switch.

19. The controller of claim 1, wherein the switching sense is configured to sense a beginning of an off-time of the power switch in response to a transition in the secondary voltage, wherein the sensed drive signal is representative of the beginning of the off-time.

20. The controller of claim 19, wherein the timer measures the duration between the request event and the beginning of the off-time off the power switch.

21. The controller of claim 1, wherein the sensed drive signal is representative of the drive signal of the power switch.

22. The controller of claim 1, wherein the drive circuit delays the turn ON of the power switch by the communication delay for every switching cycle of the power switch.

23. A power conversion system, comprising:
an energy transfer element coupled between a primary-side and a secondary-side of the power conversion system;
a power switch coupled to a primary side of energy transfer element and an input of the power conversion system; and
a first controller coupled to the power switch and configured to control switching of the power switch to control the transfer of energy by the energy transfer element, wherein the first controller includes:

a communication delay generator configured to receive a first signal, wherein the communication delay generator determines a communication delay in response to the first signal and outputs a communication signal representative of the communication delay; and a drive circuit coupled to the communication delay generator and configured to receive a request signal, wherein the request signal includes a request event to turn ON the power switch and outputs a drive signal to turn ON the power switch in response to the request event, wherein the drive circuit is further configured to receive the communication signal and responsive to the communication signal, delays the turn ON of the power switch by the communication delay; and a second controller coupled to the energy transfer element and configured to output the request signal in response to an output of the power conversion system, wherein the request signal includes the request event and wherein the second controller includes:

a switching sense circuit coupled to the energy transfer element and configured to sense at least one parameter of the power switch from the energy transfer element and outputs a sensed drive signal representative of the at least one parameter of the power switch; and a timer coupled to the switching sense circuit and configured to receive the request signal and the sensed drive signal, wherein the timer is configured to measure the time between the request event and the at least one parameter of the power switch to output a sensed communication delay.

24. The power conversion system of claim 23, wherein the first signal is representative of a temperature of the power switch and the communication delay is substantially zero when the temperature is less than a temperature threshold and the communication delay increases as temperature increases when the temperature is greater than the temperature threshold.

25. The power conversion system of claim 23, wherein the first signal is representative of an input voltage of the power conversion system and the communication delay decreases as the input voltage increases when the input voltage is less than a threshold and the communication delay is substantially zero when the input voltage is greater than the threshold.

26. The power conversion system of claim 23, wherein the communication delay generator receives the request signal and the first signal is representative of a trim option of the first controller, wherein the communication delay generator determines the communication delay in response to the trim option and outputs the communication signal in response to the request signal.

27. The power conversion system of claim 23, wherein the second controller further includes:

a comparator coupled to receive the output and a reference, wherein the comparator is configured to compare the output to the reference and provide a regulation signal;

a request control coupled to the comparator and configured to generate the request event in the request signal in response to the regulation signal; and a reference generator coupled to the timer and configured to receive the sensed communication delay, wherein the reference generator varies the reference in response to the sensed communication delay.

28. The power conversion system of claim 23, wherein the switching sense is configured to sense an on-time of the power switch in response to a transition in a voltage of the energy transfer element, and wherein the sensed drive signal is representative of a beginning of the on-time.

29. The power conversion system of claim 23, wherein the switching sense is configured to sense the an off-time of the power switch in response to a transition in a voltage of the energy transfer element, and wherein the sensed drive signal is representative of a beginning of the off-time.

* * * * *